US008266881B2

(12) United States Patent
McIlwain

(10) Patent No.: US 8,266,881 B2
(45) Date of Patent: Sep. 18, 2012

(54) FLEXIBLE MOTOR SUPPORT SYSTEM FOR A CROP GATHERING DEVICE HAVING A HARVESTING HEADER

(75) Inventor: Irwin D. McIlwain, Lancaster, PA (US)

(73) Assignee: CNH America LLC, New Holland, PA (US)

(*) Notice: Subject to any disclaimer, the term of this patent is extended or adjusted under 35 U.S.C. 154(b) by 111 days.

(21) Appl. No.: 12/749,324

(22) Filed: Mar. 29, 2010

(65) Prior Publication Data
US 2011/0232249 A1  Sep. 29, 2011

(51) Int. Cl.
*A01D 67/00* (2006.01)
(52) U.S. Cl. ......................................................... 56/208
(58) Field of Classification Search ............... 56/208, 56/364, 345, 14.6, 14.8, 14.3, 181, 124
See application file for complete search history.

(56) References Cited

U.S. PATENT DOCUMENTS

| | | | | |
|---|---|---|---|---|
| 1,724,300 A | * | 8/1929 | Moncreiffe | 56/14.8 |
| 2,608,041 A | * | 8/1952 | Schoenrock | 56/14.6 |
| 3,474,605 A | * | 10/1969 | Resetich | 56/16.4 R |
| 3,628,317 A | * | 12/1971 | Lederer | 56/219 |
| 4,171,606 A | * | 10/1979 | Ziegler et al. | 56/10.2 E |
| 4,199,092 A | | 4/1980 | Rose | |
| 4,261,163 A | * | 4/1981 | Shaw | 56/327.1 |
| 4,304,089 A | * | 12/1981 | Mescheryakov et al. | 56/364 |
| 4,304,090 A | * | 12/1981 | Gavrilenko et al. | 56/364 |
| 4,463,546 A | * | 8/1984 | Day | 56/364 |
| 4,566,689 A | | 1/1986 | Ogden | |
| 4,567,719 A | * | 2/1986 | Soots et al. | 56/364 |
| 4,617,787 A | * | 10/1986 | Eguchi et al. | 56/14.6 |
| 4,841,718 A | * | 6/1989 | Sund | 56/364 |
| 4,970,849 A | * | 11/1990 | Friesen | 56/12.4 |
| 5,090,187 A | * | 2/1992 | Mews | 56/364 |
| 5,149,049 A | | 9/1992 | Nemura et al. | |
| 5,419,086 A | | 5/1995 | Duckinghaus | |
| 5,810,237 A | | 9/1998 | Eskola et al. | |
| 5,822,959 A | * | 10/1998 | Norton | 56/1 |
| 6,202,397 B1 | | 3/2001 | Watts et al. | |
| 6,212,865 B1 | * | 4/2001 | Peeters et al. | 56/366 |
| 6,234,445 B1 | | 5/2001 | Yoon | |
| 6,557,816 B2 | | 5/2003 | Yoshida | |
| 7,520,113 B2 | | 4/2009 | Johnson et al. | |
| 7,726,111 B2 | * | 6/2010 | Grywacheski et al. | 56/364 |
| 7,866,136 B1 | * | 1/2011 | Hill et al. | 56/364 |
| 7,971,420 B1 | * | 7/2011 | Bollin | 56/208 |
| 2007/0000226 A1 | * | 1/2007 | Grywacheski et al. | 56/364 |

FOREIGN PATENT DOCUMENTS

| | | |
|---|---|---|
| DE | 4008897 A1 | 9/1991 |
| DE | 10302698 A1 | 7/2004 |
| DE | 10343539 A1 | 6/2005 |
| GB | 2096562 A | 10/1982 |
| GB | 2144700 A | 3/1985 |
| JP | S5653561 A | 5/1981 |

* cited by examiner

*Primary Examiner* — Arpad Fabian-Kovacs
(74) *Attorney, Agent, or Firm* — Michael G. Harms

(57) ABSTRACT

A motor support system including a motor having a shaft rotatably secured to and maintained in a substantially axial alignment with a second shaft configured to change angular orientation along at least one plane of travel perpendicular to the axial alignment. The second shaft has a first pivot point with respect to a frame, the motor being secured to the frame by a cantilevered flexible member to maintain the motor shaft in substantial axial alignment with the second shaft.

16 Claims, 5 Drawing Sheets

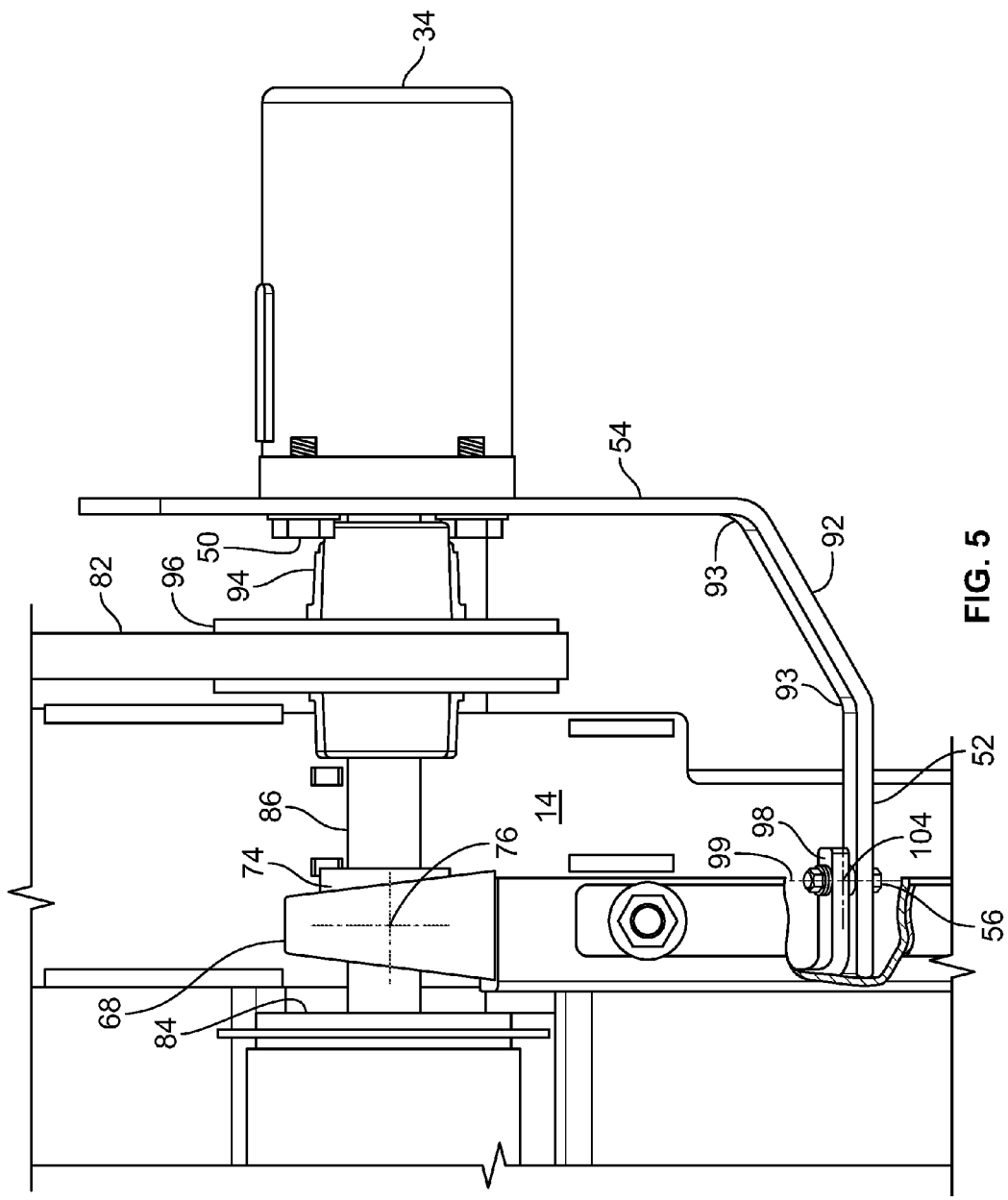

FLEXIBLE MOTOR SUPPORT SYSTEM FOR A CROP GATHERING DEVICE HAVING A HARVESTING HEADER

FIELD OF THE INVENTION

The present invention relates generally to crop gathering devices. It relates more particularly to a motor support system for use with crop gathering devices having harvesting headers.

BACKGROUND OF THE INVENTION

Crop gathering devices for collecting crops arranged in windrows can include a belt positioned along the front of the device. The belt is driven by a motor to rotate between opposed pairs of roller assemblies to convey the crops into a header that is secured to an agricultural harvester, such as a combine in which is directed along the windrow. It is desirable to maintain a constant angle ("picking angle") and spacing with respect to the ground by the crop gathering device despite encountering undulations in the field.

In operation, in response to encountering undulations, such as ruts or mounds formed in the ground or loose, foreign objects, one side of the crop gathering device may be raised with respect to the other side. The angular relationship between roller assemblies and portions of the frame can vary in response to encountering undulations. Securing the drive motor to the frame results in misalignment between the shaft of the driven roller assembly and the motor. Conventional flexible mechanical couplers used to join the motor shaft and the driven roller assembly cannot accommodate the magnitude of angular misalignment, resulting in damage and/or reduced life of these interconnected components.

SUMMARY OF THE INVENTION

The present invention relates to a crop gathering device for use with a harvesting header including a frame carrying a structure movable about an endless path by a motor to deliver a crop to the header. The frame has opposed ends and is connected to the header. The frame includes a first support member and a second support member, each support member extending adjacent the opposed ends of the frame. A driven roller assembly has a roller extending between the opposed ends of the frame, a region of the roller of the driven roller assembly being rotatably secured between the opposed ends of the frame. An idler roller assembly has a roller extending between the opposed ends of the frame, a region of the roller of the idler roller assembly being rotatably secured between the opposed ends of the frame. The opposed ends of the frame are configured to permit a vertical movement with respect to each other in response to at least one of the first support member or the second support member encountering a ground undulation, thereby changing an angular orientation between each of the opposed ends of the frame. The Driven roller assembly and the idler roller assembly are configured and positioned to move the structure for delivering a crop to the header. The motor is rotatably secured to and maintained in a substantially axial alignment with the roller of the driven roller assembly, the motor being secured to the frame by a cantilevered flexible member.

The present invention further relates to a motor support system including a motor having a shaft rotatably secured to and maintained in a substantially axial alignment with a second shaft configured to change angular orientation along at least one plane of travel perpendicular to the axial alignment. The second shaft has a first pivot point with respect to a frame, the motor being secured to the frame by a cantilevered flexible member to maintain the motor shaft in substantial axial alignment with the second shaft.

An advantage of the present invention is improved, extended and more reliable operation of the crop gathering device, due to the motor support system, accommodating misalignment between the motor and the driven roller assembly.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 5 is an enlarged, partial plan view of the motor support system taken from Region 5 (hydraulic lines removed) of FIG. 4 of the present invention.

Wherever possible, the same reference numbers will be used throughout the drawings to refer to the same or like parts.

DETAILED DESCRIPTION OF THE INVENTION

Figure 1:
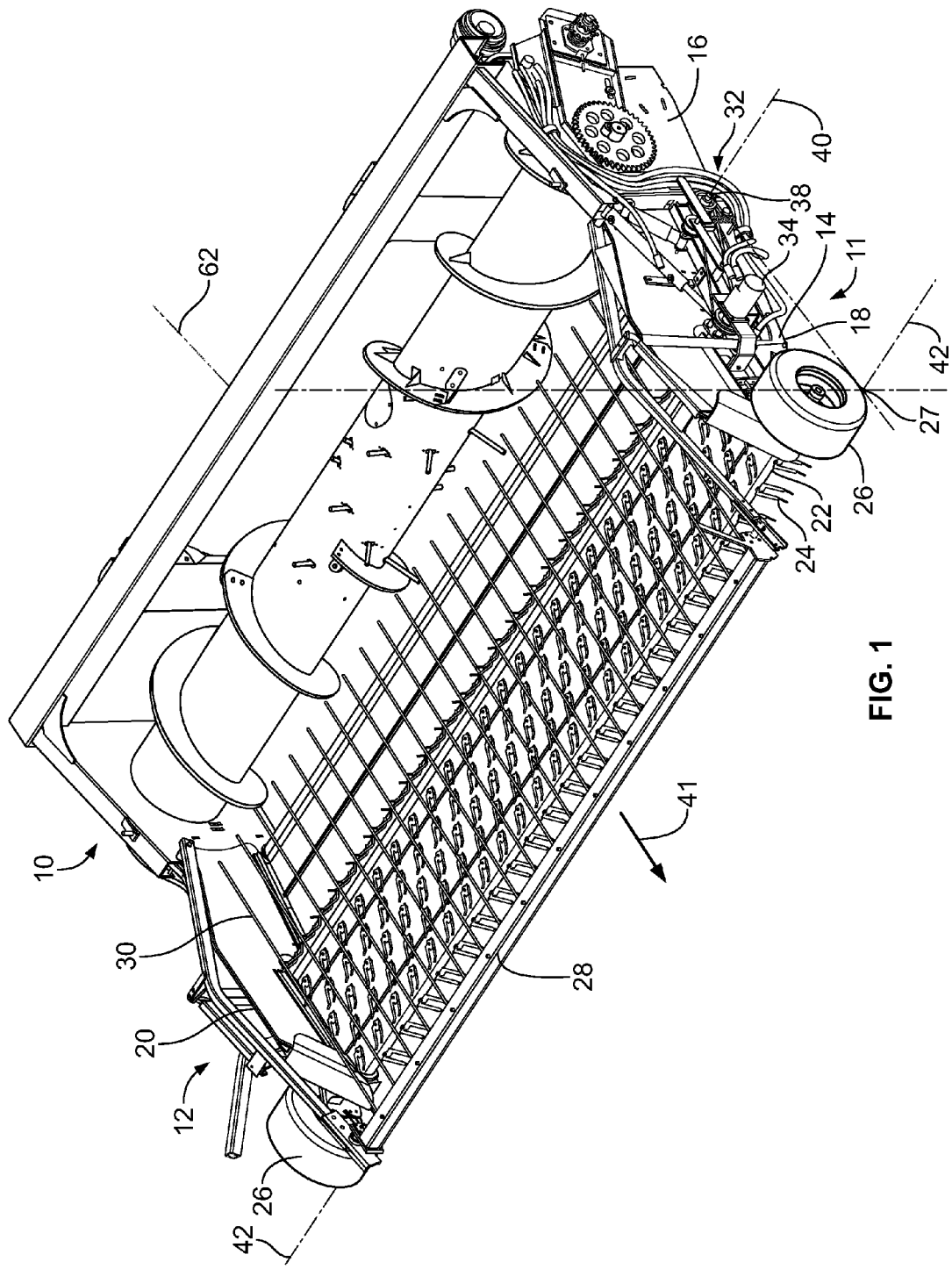
FIG. 1 is a top perspective view of an embodiment of a crop gathering device and harvesting header of the present invention.

FIGS. 1-4 show a motor support system 11 usable with a crop gathering device 12 for use with a harvesting header 10. Harvesting header 10 may be secured to an agricultural vehicle such as a combine (not shown) as is known in the art and not further discussed. A frame 14 carries a structure 22 movable about an endless path to deliver a crop to harvesting header 10. In one embodiment, structure 22 is a belt, or multiple belts, that extends from one end 18 of frame 14 toward another end 20 of frame 14. Structure 22 may be driven about a set of parallel rollers (not shown) by a power source or motor such as a hydraulic motor 34. Structure 22 may include a plurality of tines 24 or fork-like components extending outwardly from the structure to assist with collecting crops arranged in a windrow. Support member 26, such as guide wheels or a sled or other suitable arrangement, may be affixed or rotatably secured to or near respective ends 18, 20 of frame 14 opposite header 10 to maintain one end of structure 22 near the ground 36 to permit tines 24 of structure 22 to gather or collect crops arranged in the windrow. A guide 28 equipped with tines 30 may be positioned over structure 22 to more effectively feed crops from structure 22 to header 10.

Frame 14 may be pivotally connected to a frame 16 of header 10 about a pivot 38, such as a pin, having an axis 40. As shown in FIG. 1, axis 40 is generally perpendicular to a direction of travel 41 of the vehicle. Without intending to limit the invention, several axes are provided to provide context for the pivotal movement between frame 14 and frame 16 of header 10. An axis 42 is defined by the collective ground contact regions 27 of support members 26 or wheels, positioned proximate to each of ends 18, 20 of frame 14. As further shown in FIG. 1, axis 42 corresponds to support members 26 or wheels each being in contact with "level" or non-undulating ground 36 so that axis 42 and ground 36 are coincident so that the angle 44 therebetween is zero degrees. In another operating condition, ground contact regions 27 of respective opposed support members 26 may be located at different vertical elevations than "level" ground conditions, subjecting frame 14 to torsional forces generally directed about an axis parallel to the direction of travel 41 of the vehicle. Such a condition may occur when support member 26 encounters an undulation 64, in which undulation 64 (FIG. 2) is proximate to end 20 of frame 14. In other conditions either or both of support members 26 may encounter ground undulations (raised or recessed regions with respect to "level" ground).

To assist with understanding the invention, and to provide context and points of reference, while not intending to be limiting, upon encountering undulation 64 (FIG. 2), the axis connecting respective ground contact regions 27 of support members 26 is defined by axis 42'. An angle 44' is subtended between ground 36 and axis 42', in which angle 44' is coincident with a plane defined by vertically extending axis 47 and axis 42. Stated another way, angle 44' is a measure of the difference of vertical elevation between the opposed contact regions 27. As a result of vertical angle 44', frame 14 is subjected to a torsional or twisting force directed about an axis that generally corresponds to the direction of travel 41 of the vehicle. However, in another embodiment in which support members 26 are not positioned substantially transverse with respect to frames 14, 16 that are symmetric about a center line (not shown), the resulting torsional or twisting force may not generally correspond to the direction of travel 41 of the vehicle.

Figure 2:
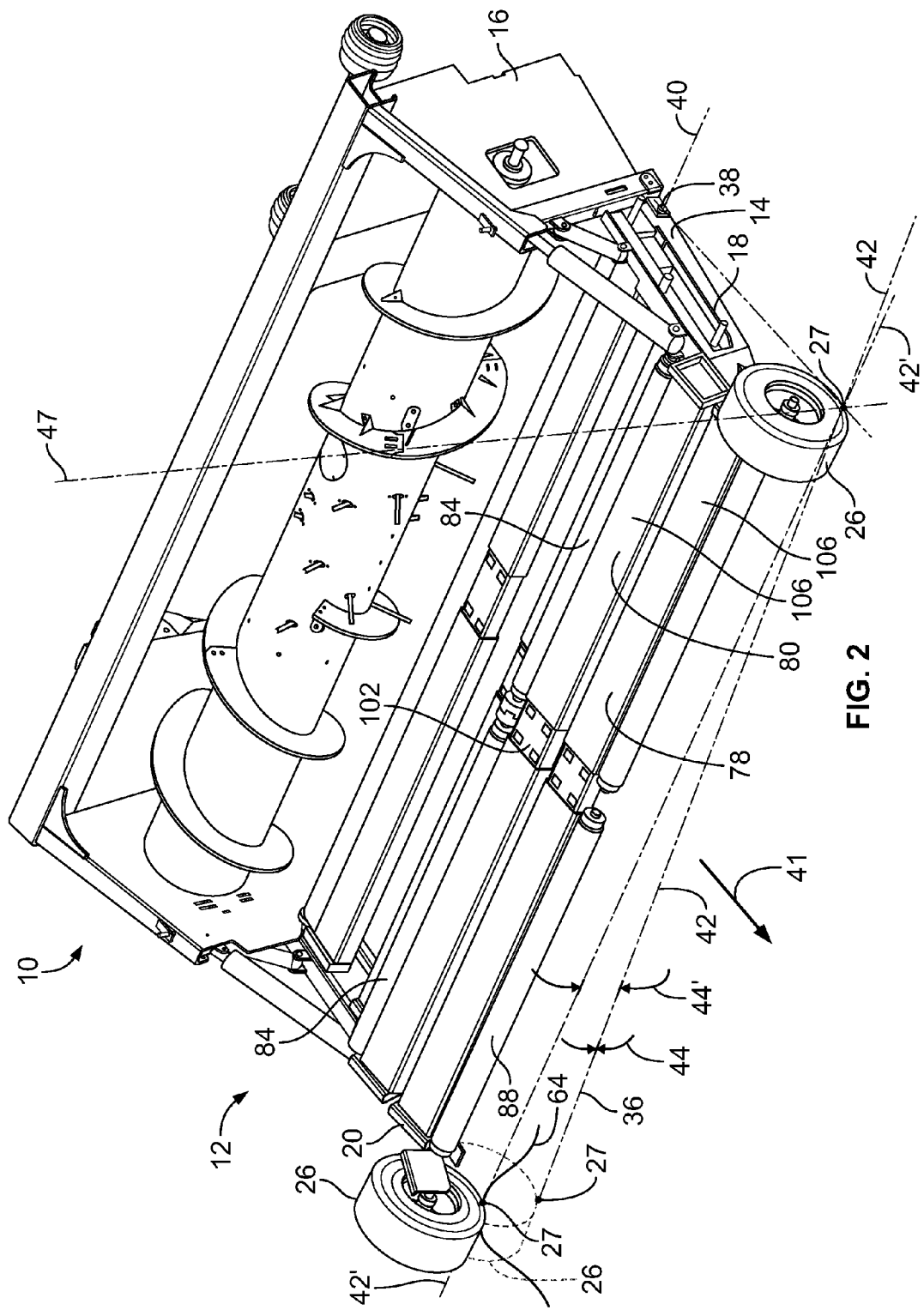
FIG. 2 is a top perspective view of an embodiment of a crop gathering device (the crop conveying belt not shown) and harvesting header of the present invention.
Figure 3:
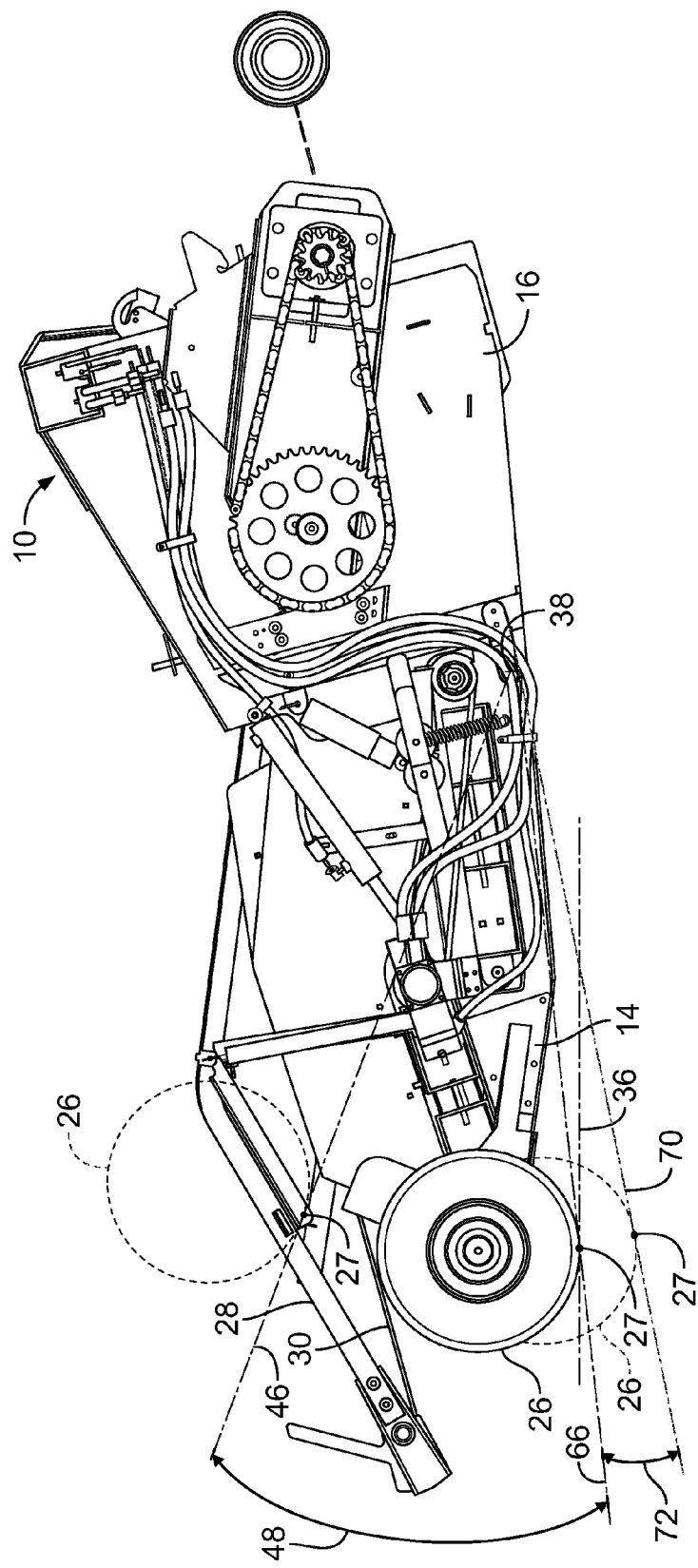
FIG. 3 is a side view of the crop gathering device of FIG. 1 (the crop conveying belt not shown) of the present invention.

As further shown in FIGS. 2-3, in one position of frame 14, such as when a support member 26 is in contact with "level" or non-undulating ground 36, an axis 66 is defined by pivot 38 and contact region 27 of support member 26 or wheel. In another position of frame 14, such as when support member 26 or wheel is raised vertically, such as in contact with "non-level" or upwardly undulating ground 36, an axis 46 is defined by pivot 38 and the raised contact region 27 of support member 26 or wheel. An angle 48 is subtended by axis 46 and axis 66. In another position of frame 14, such as when support member 26 or wheel is lowered vertically with respect to "level" or non-undulating ground 36, such as in contact with "non-level" or downwardly undulating ground 36, an axis 70 is defined by pivot 38 and the vertically lowered or vertically recessed contact region 27 of support member 26 or wheel. An angle 72 is subtended by axis 70 and axis 66.

In one embodiment, as will be discussed in further detail below, the vertical distance between the contact regions 27 of support member 26 may be up to about 12 inches, or more, with each of the support members maintaining contact with the undulating/non-undulating ground 36. Stated another way, the structure of frame 14 is configured to torsionally flex sufficiently such that despite one support member 26 encountering an undulation in the ground that results in raising (or lowering or combination of raising and lowering between the opposed support members) one support member up to about 12 inches or more with respect to the other support member, the other support member would remain in contact with the undulating/non-undulating ground, i.e., contact region 27 would not be raised into the air.

As shown in FIG. 2 (structure 22 is removed for clarity), support members 78, 80 each extend between respective ends 18, 20 of frame 14. In one embodiment, support members 78, 80 extend unsupported between respective ends 18, 20 of frame 14. Support members 78, 80 include a pair of portions or segments 106 that may be in substantial axial alignment with each other. An insert member 102 may be positioned between the ends of portions or segments 106 of support members 78, 80. In an alternate embodiment, support member 78, 80 may be of unitary construction, that is, support members 78, 80 may be of one-piece construction. Support members 78, 80 may be composed of a tube structure, C-channel or other construction, so long as the support member has sufficient structural rigidity to substantially prevent deflection in response to loading conditions described below.

An idler roller assembly 88 and a driven roller assembly 84 rotate about their respective axes to move structure 22 or belt therearound to pick up windrowed crops. Applicant's pending application Ser. No. 12/564,629 more fully discloses such structure and is incorporated by reference in its entirety.

Figure 4:
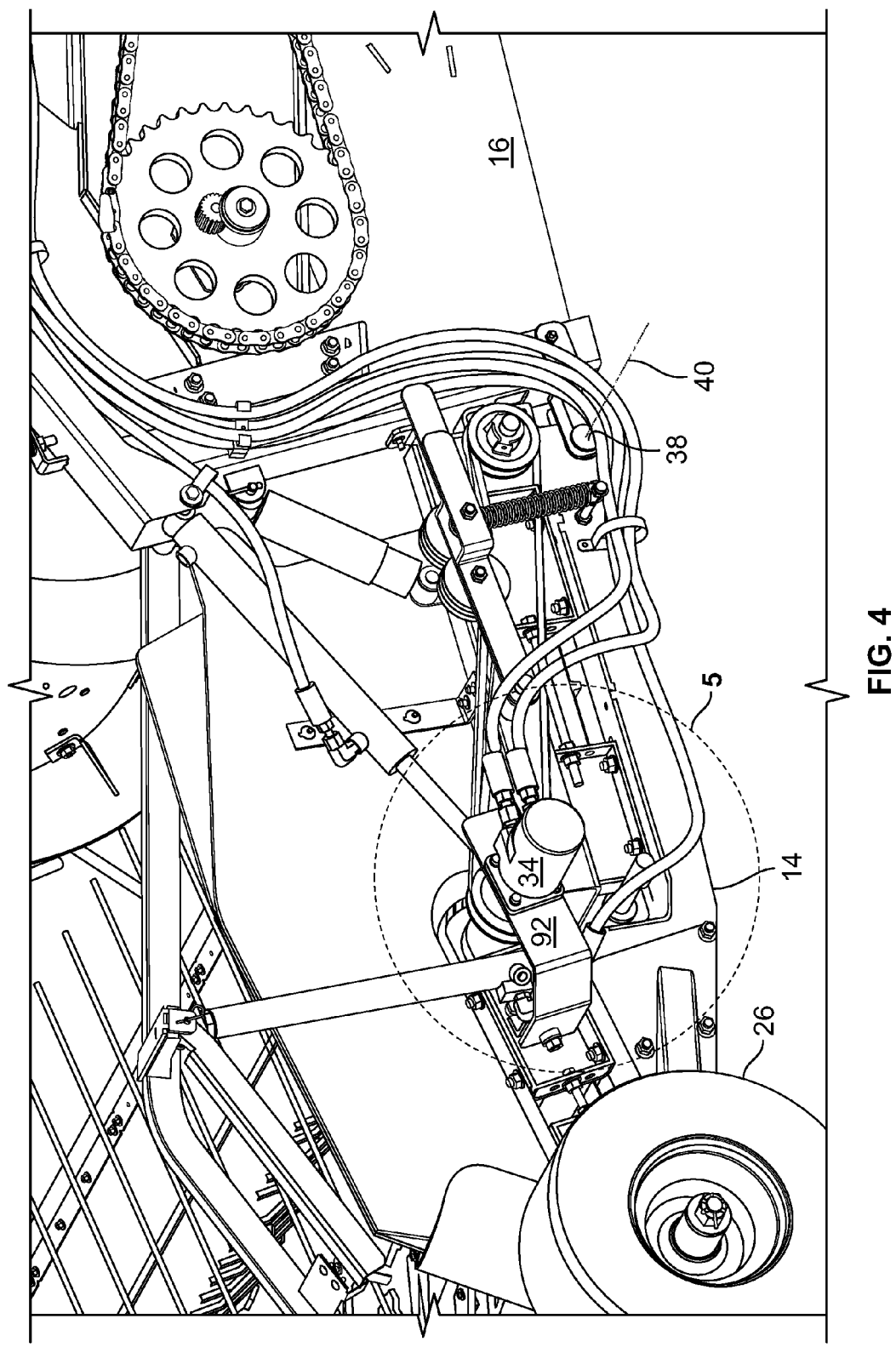
FIG. 4 is an enlarged, partial perspective view of the crop gathering device of FIG. 1 of the present invention.

Referring to FIGS. 4-5, driven roller assembly 84 extends to a shaft or roller 86 that is inserted through a fitting 68 to form a shaft pivot joint 74. In one embodiment, shaft pivot joint 74 may define a spherical roller defining a shaft pivot point 76. Shaft or roller 86 further extends and is secured to one end of a coupler hub 94. Hydraulic motor 34 includes a rotating shaft (not shown) that inserts inside and is non-rotatably secured to an opposed end of coupler hub 94. In other words, the respective shafts of driven roller assembly 84 and hydraulic motor 34 are rotatably secured to and maintained in a substantially axial alignment with each other, as the opposed ends of coupler hub 94 are secured to the ends of each of the shafts. In other words, coupler hub 94 prevents the shaft of driven roller assembly 84 from rotating with respect to the shaft of motor 34. As further shown in FIG. 5, coupler hub 94 includes a pulley 96 for drivingly engaging a belt 82 that similarly engages a pulley 108 associated with idler roller assembly 88 for urging belt 22 (FIG. 1) into movement for delivering a crop to the header.

Flexible member 92 includes a first portion 52 configured to receive fasteners 56 inserted through mutually aligned openings formed in the first portion and an angle 98 that are connected to frame 14 to secure flexible member 92 to frame 14. First portion 52 extends to a second portion 54 that is configured to receive fasteners 50 for securing hydraulic motor 34 to second portion 54. As shown in FIG. 5, a pair of bends 93 are formed between the first and second portions 52, 54. In one embodiment, a single bend 93 may be formed between the first and second portions 52, 54, defining an arc or radius, although other bend radii magnitudes and/or combinations of bends may be used. In a further embodiment, flexible member 92 may be formed from bar stock of uniform thickness and/or width. In yet another embodiment, flexible member 92 may be of unitary construction. Flexible member 92 may be composed of metal or a nonmetal, so long as the material used is compatible with mating components and is of sufficient structural strength and resistance to fatigue, due to flexing during operation.

Therefore as shown in FIG. 5, while the shaft of hydraulic motor 34 and driven roller assembly 84 may be in rotatable axial alignment with no or negligible side loads in a position in which both wheels or support members 26 (see FIG. 1) are vertically aligned, operation of the crop gathering device on an uneven field surface presents other conditions. That is, in response to wheels or support members 26 being placed in vertical misalignment, such as shown in FIG. 2, shaft 86 of driven roller assembly 84 would change its angular orientation between each of the opposed ends 18, of frame 14. In other words, shaft 86 of driven roller assembly 84 would rotate about shaft pivot joint 74, which would form a similarly misaligned orientation with the shaft of motor 34. However, due to the inventive aspects of flexible member 92, in which second portion 54 is cantilevered from opposed first portion 52 of the flexible member 92, second portion 54 is flexibly urged toward a position in which axial alignment with shaft 86 of driven roller assembly 84 is maintained.

As further shown in FIG. 5, flexible member 92 is configured to have a motor pivot joint 99 and a motor pivot point 104. In this arrangement, motor pivot point 104 and shaft pivot point 76 are positioned adjacent to each other, allowing the respective shafts of both rotating components (i.e., motor 34 and driven roller assembly 84) to pivot about points separated by a minimal distance. That is, while in an ideal arrangement, motor pivot point 104 and shaft pivot point 76 would be coincident, the minor misalignment or separation distance between the pivot points can be tolerated because the motor pivot point contains an amount of clearance between the relative rotating surfaces.

In summary, for an exemplary embodiment, and not intending to be limiting, a crop gathering device 12 for use with a harvesting header 10 including a frame 14 carrying a structure 22 movable about an endless path by a motor 34 to deliver a crop to the header 10. The frame 14 has opposed ends 18, 20 and is connected to the header 10. The frame 14 includes a first support member 26 and a second support member 26, each support member 26 extending adjacent to the opposed ends 18, 20 of the frame 14. A driven roller assembly 84 has a roller 86 extending between the opposed ends 18, 20 of the frame 14, a region of the roller 86 of the driven roller assembly 84 being rotatably secured between the opposed ends 18, 20 of the frame 14. An idler roller assembly 88 has a roller 90 extending between the opposed ends 18, 20 of the frame 14, a region of the roller 90 of the idler roller assembly 88 being rotatably secured between the opposed ends 18, 20 of the frame 14. The opposed ends 18, 20 of the frame 14 are configured to permit a vertical movement with respect to each other in response to at least one of the first support member 26 or the second support member 26 encountering a ground undulation 64, thereby changing an angular orientation between each of the opposed ends 18, 20 of the frame 14. The driven roller assembly 84 and the idler roller assembly 88 are configured and positioned to move the structure 22 for delivering a crop to the header 10. The motor 34 is rotatably secured to and maintained in a substantially axial alignment with the roller 86 of the driven roller assembly 84, the motor 34 being secured to the frame 14 by a cantilevered flexible member 92.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A crop gathering device for use with a harvesting header comprising:
   a frame carrying a structure movable about an endless path by a motor to deliver a crop to the header, the frame having opposed ends and connected to the header;
   the frame comprising:
   a first support member and a second support member, each support member extending adjacent the opposed ends of the frame;
   a driven roller assembly having a roller extending between the opposed ends of the frame, a region of the roller of the driven roller assembly being rotatably secured between the opposed ends of the frame;
   an idler roller assembly having a roller extending between the opposed ends of the frame, a region of the roller of the idler roller assembly being rotatably secured between the opposed ends of the frame; and
   the opposed ends of the frame configured to permit a vertical movement with respect to each other in response to at least one of the first support member or the second support member encountering a ground undulation, thereby changing an angular orientation between each of the opposed ends of the frame; and
   wherein the driven roller assembly and the idler roller assembly are configured and positioned to move the structure for delivering a crop to the header; and
   wherein the motor is rotatably secured to and maintained in a substantially axial alignment with the roller of the driven roller assembly, the motor being secured to the frame by a cantilevered flexible member, the flexible member has one end coupled to the motor and another end pivotally fixed to the frame, wherein a change of angular orientation between each of the opposed ends of the frame causes a change of angular orientation of the roller of the driven roller assembly in a first direction, resulting in a change of angular orientation of the motor in the first direction, further wherein the flexible member flexibly urges the angular orientation of the motor in a second direction, wherein the second direction is opposite to the first direction.

2. The system of claim 1, wherein the structure is a first belt.

3. The system of claim 2, further comprising a third support member and a fourth support member, each support member extending between the opposed ends of the frame to provide structural support for a driven roller assembly and an idler roller assembly.

4. The system of claim 1, wherein the motor is a hydraulic motor.

5. The system of claim 1, wherein a coupler hub is positioned between the motor and the roller of the driven roller assembly.

6. The system of claim 5, wherein the coupler hub is configured to receive a second belt for urging the idler roller assembly into rotational movement to movably urge the structure about an endless path.

7. The system of claim 1, wherein the flexible member includes at least one bend formed therein.

8. The system of claim 7, wherein the at least one bend defines a radius between a first portion and a second portion of the flexible member.

9. The system of claim 1, wherein the flexible member is of unitary construction.

10. The system of claim 9, wherein the flexible member is a bar.

11. The system of claim 10, wherein the bar has a substantially uniform width.

12. The system of claim 10, wherein the bar has a substantially uniform thickness.

13. The system of claim 5, wherein a pivot joint is located between the idler roller assembly and the coupler hub.

14. The system of claim 13, wherein the pivot joint is a spherical bearing.

15. The system of claim 13, wherein a pivot point associated with the pivot joint and a pivot point associated with the flexible member are adjacent to each other.

16. The system of claim 1, wherein the pivotally fixed end of the flexible member allows the flexible member to pivot up and down with the roller of the driven roller assembly.

* * * * *